US011635036B2

(12) United States Patent
Akagi

(10) Patent No.: US 11,635,036 B2
(45) Date of Patent: *Apr. 25, 2023

(54) SIGNAL PROCESSING DEVICE, AND ENGINE CONTROL DEVICE

(71) Applicant: Hitachi Astemo, Ltd., Hitachinaka (JP)

(72) Inventor: Yoshihiko Akagi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,584

(22) Filed: Jan. 21, 2022

(65) Prior Publication Data

US 2022/0145819 A1    May 12, 2022

Related U.S. Application Data

(63) Continuation of application No. 17/253,860, filed as application No. PCT/JP2019/031314 on Aug. 8, 2019, now Pat. No. 11,261,811.

(30) Foreign Application Priority Data

Aug. 30, 2018 (JP) ................................ 2018-161031

(51) Int. Cl.
*F02D 41/14* (2006.01)
*F02D 35/02* (2006.01)
*F02D 41/28* (2006.01)

(52) U.S. Cl.
CPC ....... *F02D 41/1401* (2013.01); *F02D 35/023* (2013.01); *F02D 35/027* (2013.01);
(Continued)

(58) Field of Classification Search
CPC .. F02D 41/1401; F02D 35/023; F02D 35/027; F02D 41/28; F02D 2041/1432; F02D 2041/286; F02D 2200/101
(Continued)

(56) References Cited

U.S. PATENT DOCUMENTS 4,498,331 A * 2/1985 Nakamura ............ G01L 23/225
701/111
4,513,718 A * 4/1985 Ishii ...................... F02P 5/1525
123/406.36
(Continued)

FOREIGN PATENT DOCUMENTS

EP    1128050 A2    8/2001
JP    S56-637 A    1/1981
(Continued)

OTHER PUBLICATIONS

International Search Report with English translation and Written Opinion issued in corresponding application No. PCT/JP2019/031314 dated Dec. 3, 2019.

*Primary Examiner* — Sizo B Vilakazi
*Assistant Examiner* — Brian R Kirby
(74) *Attorney, Agent, or Firm* — Foley & Lardner LLP

(57) ABSTRACT

Provided is a signal processing device capable of effectively reducing a work load of a parameter setting operator in response to an increase in parameters constituting complicated filter control. Therefore, in the signal processing device filters an output signal from a sensor mounted on a vehicle, setting is made with respect to a plurality of filters having different filter types or filter coefficients for setting a filter characteristic of a cutoff frequency or a pass band, an individual code is set for each of the plurality of filters, and the signal processing device includes a CPU that selects the individual code based on an engine operating state so that a corresponding filter is selected, and processes an output signal from the sensor using the filter that has been selected.

6 Claims, 16 Drawing Sheets

(52) U.S. Cl.
CPC ...... *F02D 41/28* (2013.01); *F02D 2041/1432* (2013.01); *F02D 2041/286* (2013.01); *F02D 2200/101* (2013.01)

(58) Field of Classification Search
USPC .................................................. 701/102–111
See application file for complete search history.

(56) References Cited

U.S. PATENT DOCUMENTS

| | | | | |
|---|---|---|---|---|
| 5,052,214 A | * | 10/1991 | Dils | G01L 23/221 |
| | | | | 701/111 |
| 5,206,809 A | * | 4/1993 | Iwakiri | G01L 23/225 |
| | | | | 73/114.02 |
| 5,408,863 A | * | 4/1995 | Sawyers | F02D 35/027 |
| | | | | 73/35.05 |
| 5,522,254 A | | 6/1996 | Kamabora | |
| 5,992,386 A | * | 11/1999 | Nytomt | G01L 23/225 |
| | | | | 73/114.08 |
| 6,750,798 B2 | * | 6/2004 | Honda | G01L 23/225 |
| | | | | 708/319 |
| 10,995,691 B2 | * | 5/2021 | Biehl | F02D 41/1401 |
| 2004/0030486 A1 | * | 2/2004 | Sauler | G01L 23/225 |
| | | | | 701/111 |
| 2004/0204814 A1 | * | 10/2004 | Honda | G01L 23/225 |
| | | | | 701/111 |
| 2005/0039721 A1 | * | 2/2005 | Truscott | F02P 5/153 |
| | | | | 123/406.27 |
| 2005/0261821 A1 | * | 11/2005 | Abe | F02D 41/266 |
| | | | | 701/111 |
| 2006/0117834 A1 | * | 6/2006 | Goto | G01L 23/225 |
| | | | | 73/35.09 |
| 2007/0277780 A1 | * | 12/2007 | Akazaki | F02P 5/153 |
| | | | | 701/111 |
| 2008/0257025 A1 | * | 10/2008 | Miyaji | G01M 15/12 |
| | | | | 73/114.07 |
| 2009/0182491 A1 | * | 7/2009 | Bauer | F02D 41/009 |
| | | | | 701/115 |
| 2010/0286893 A1 | * | 11/2010 | Huang | G01M 15/12 |
| | | | | 73/35.09 |
| 2011/0257872 A1 | | 10/2011 | Masuda | |
| 2015/0040864 A1 | * | 2/2015 | Gibson | F02P 5/145 |
| | | | | 123/406.23 |
| 2016/0265453 A1 | * | 9/2016 | Bizub | F02D 41/1401 |
| 2019/0128200 A1 | * | 5/2019 | Nagappa | F02D 35/024 |

FOREIGN PATENT DOCUMENTS

| | | | |
|---|---|---|---|
| JP | S58-45520 A | | 3/1983 |
| JP | S63-295864 A | | 12/1988 |
| JP | H06-249047 A | | 9/1994 |
| JP | H07-139415 A | | 5/1995 |
| JP | 2001-234800 A | | 8/2001 |
| JP | 2006-291786 A | | 10/2006 |
| JP | 2008-064023 A | | 3/2008 |
| JP | 2008064023 A | * | 3/2008 |
| JP | 2009-042027 A | | 2/2009 |
| JP | 2011-179322 A | | 9/2011 |
| JP | 2011-179323 A | | 9/2011 |
| JP | 2017-160809 A | | 9/2017 |
| JP | 2018-003631 A | | 1/2018 |
| WO | WO-2017/141582 A1 | | 8/2017 |

\* cited by examiner

FIG. 3
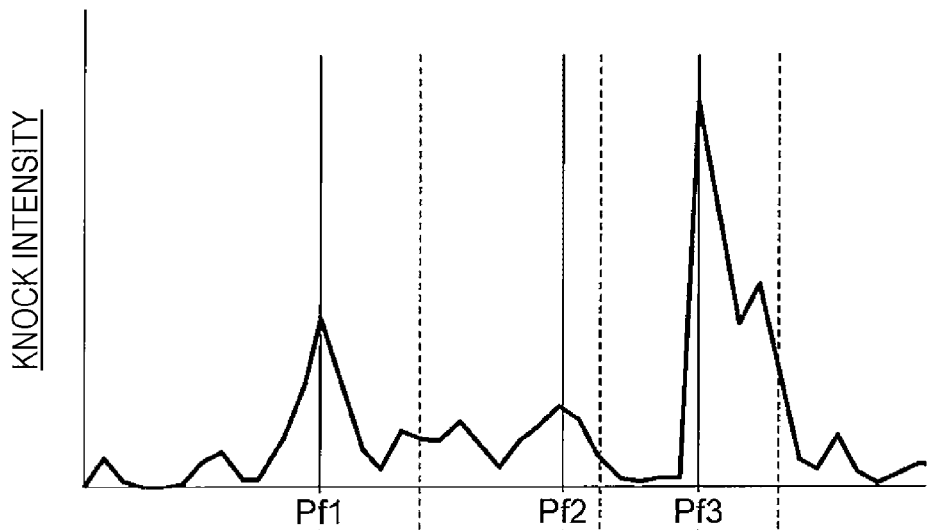
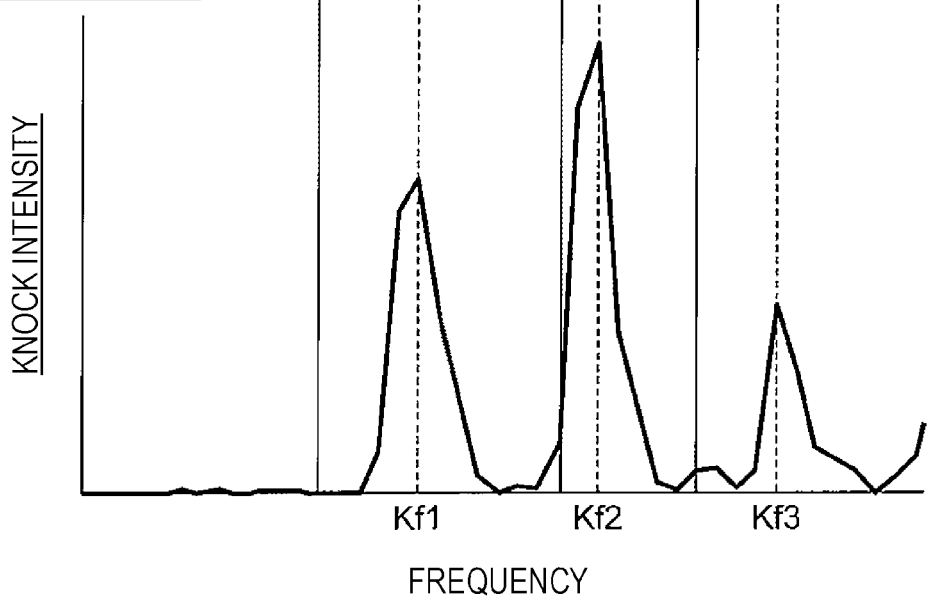

FIG. 13

| ROTATION SPEED<br>CYLINDER NUMBER | 0 | 2000 | 4000 | 6000 |
|---|---|---|---|---|
| 1 CYLINDER | 7.0kHz | 7.0kHz | 7.0kHz | 7.0kHz |
| 2 CYLINDER | 6.8kHz | 6.6kHz | 6.8kHz | 6.6kHz |
| 3 CYLINDER | 6.8kHz | 6.8kHz | 6.8kHz | 6.8kHz |
| 4 CYLINDER | 7.2kHz | 7.0kHz | 6.8kHz | 6.8kHz |

FIG. 15

| COOLING WATER TEMPERATURE / ROTATION SPEED | 0 | 2000 | 4000 | 6000 |
|---|---|---|---|---|
| 40°C | 6.6kHz | 6.8kHz | 6.8kHz | 7.0kHz |
| 60°C | 6.8kHz | 6.6kHz | 6.8kHz | 6.6kHz |
| 80°C | 6.8kHz | 6.8kHz | 7.0kHz | 7.0kHz |
| 100°C | 7.2kHz | 7.0kHz | 7.0kHz | 7.2kHz |

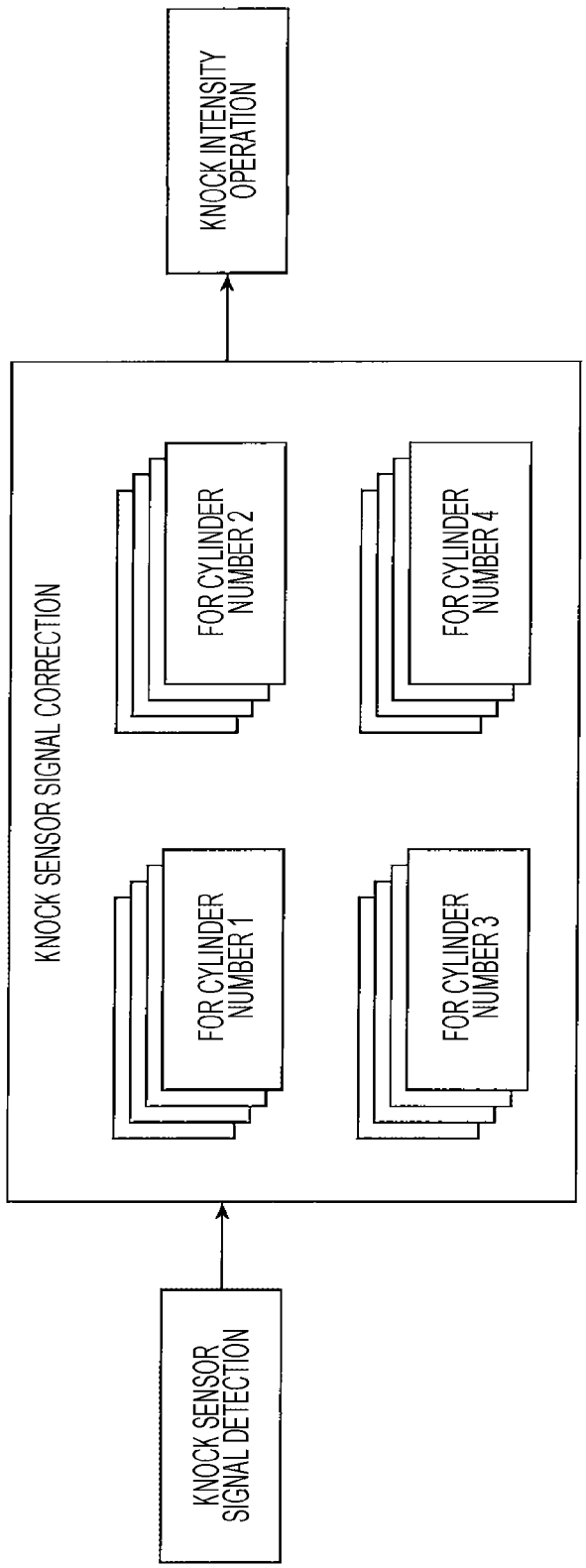

SIGNAL PROCESSING DEVICE, AND ENGINE CONTROL DEVICE

CROSS-REFERENCE TO RELATED APPLICATIONS

The present application is a continuation of U.S. patent application Ser. No. 17/253,860, filed on Dec. 18, 2020, which is a National Stage Entry of PCT/JP2019/031314, filed Aug. 8, 2019, which is based upon and claims the benefit of priority from Japanese Patent Application No. 2018-161031, filed Aug. 30, 2018. The entire contents of all of the above applications are incorporated herein by reference.

TECHNICAL FIELD

The present invention relates to a signal processing device and an engine control device.

BACKGROUND ART

A filter function for engine control is used for various sensor inputs. Among them, a knock is a phenomenon in which gas in a combustion chamber vibrates due to self-ignition of unburned gas in a terminal part of the combustion chamber of an engine, and this vibration is transmitted to a main body of the engine. Since not only combustion but also vibration characteristics of the main body of the engine are also involved in this phenomenon, a sophisticated filter function is required. The knock causes a loss of energy generated by the engine (decrease in output), an impact on each part of the engine, and a decrease in fuel consumption. Therefore, it is desirable to avoid the knock as much as possible, and for that purpose, it is essential to accurately detect the occurrence of a knock.

For example, a conventional method as disclosed in PTL 1 below is known, the method including: separating only a single resonance frequency component in the range of 5 to 12 kHz from an output signal of a vibration sensor by using a bandpass filter, and detecting occurrence of a knock on the basis of whether or not an integrated value of the output of the separation is larger than a background level (past values of output signals of the vibration sensor is weighted-averaged).

However, as disclosed in PTL 1, the method of detecting occurrence of a knock by using only a single resonance frequency component has problems that the background level becomes large at high speed rotation of the engine so that occurrence of a knock cannot be detected accurately, and when the specifications of the engine change, the resonance frequency of the knock also changes so that occurrence of a knock cannot be detected accurately.

Therefore, PTL 2 below discloses a knock detection device including a vibration sensor that detects vibration generated in an engine, and a filter circuit connected to the vibration sensor and having a plurality of filters having filter characteristics of different frequency bands in a knock frequency band.

A knock resonance frequency generated in an engine varies depending on the operating state of the engine. For example, the knock resonance frequency varies depending on whether the engine rotation speed is high or low. Therefore, if a plurality of filter circuits having filter characteristics of different frequency bands are provided for the knock resonance frequencies and the filter circuit output is selected according to the operating state of the engine, highly reliable knock detection can be performed.

In recent years, a method of achieving a filter circuit by a digital filter by software mounted on a microcomputer, and a method of configuring a digital filter as a function of a microcomputer are also known.

PTL 3 below discloses a method of resolving a response delay caused by a delay filter used to detect a background level. In PTL 3, an operating state of the engine is detected in accordance with the change in the engine rotation speed, and a knock determination threshold is corrected on the basis of the operating state.

CITATION LIST

Patent Literature

PTL 1: JP 58-045520 A
PTL 2: JP 56-000637 A
PTL 3: JP 63-295864 A

SUMMARY OF INVENTION

Technical Problem

By the way, in recent years, attempts have been made to increase the compression ratio of an engine in response to demands such as improvement of fuel efficiency and improvement of exhaust gas purification performance. On the other hand, increasing the compression ratio makes a knock more likely to occur, so there is expectation for further improved knock detection accuracy.

However, for example, in the method of extracting a plurality of resonance frequency components and detecting a knock as disclosed in PTL 2, when the knock detection accuracy is further improved, it is necessary to solve the problems as described below.

That is, with the sophistication of knock control, knock detection with a preferable S/N ratio is required, and there is an increasing demand for using a plurality of narrow band filters. In order to meet the demand, a plurality of filters with increased degree of freedom in filter setting are used, which complicates filter control. Then, as the number of parameters constituting the complicated filter control increases, the operator who sets the parameters (filter coefficients) of the knock detection filter needs to perform complicated parameter setting, and there may be problems that the work requires much time, and mistakes are easy to occur in the work.

The present invention has been made in view of the above problems, and an object of the present invention is to provide a signal processing device capable of effectively reducing a work load of a parameter setting operator in response to an increase in parameters constituting complicated filter control.

Solution to Problem

In order to solve the above problem, the present invention is a signal processing device that filters an output signal from a sensor mounted on a vehicle, in which setting is made with respect to a plurality of filters having different filter types or filter coefficients for setting a filter characteristic of a cutoff frequency or a pass band, an individual code is set for each of the plurality of filters, and the signal processing device includes a CPU that selects the individual code on the basis of an engine operating state so that a corresponding filter is selected, and processes an output signal from the sensor using the filter that has been selected.

Advantageous Effects of Invention

According to the present invention, it is possible to provide an easy-to-use filter capable of reducing a work load of a parameter setting operator in response to increase in parameters constituting complicated filter control.

The problems, configurations, and effects other than those described above will be clarified from the description of the embodiments below.

BRIEF DESCRIPTION OF DRAWINGS

FIG. 3 is a comparative explanatory diagram of knock intensity by a pressure sensor and knock intensity by a knock sensor.

FIG. 13 is an explanatory diagram of a relationship between an engine state, a cylinder number, and a knock occurrence frequency, and filter setting by the ECU in the present embodiment.

FIG. 15 is an explanatory diagram of a relationship between an engine state, a cylinder number, and a knock occurrence frequency, and filter setting by the ECU in the present embodiment.

FIG. 16 is a functional block diagram of the CPU of the ECU in the present embodiment.

DESCRIPTION OF EMBODIMENTS

Hereinafter, an embodiment of the present invention will be described in detail with reference to the drawings. However, the present invention is not limited to the embodiment below, and various modifications and application examples also fall within the range in the technical concept of the present invention.

First, a general principle of knock detection as an example of signal processing in the present invention will be described below. Thereafter, an embodiment of the present invention will be specifically described.

Figure 1:
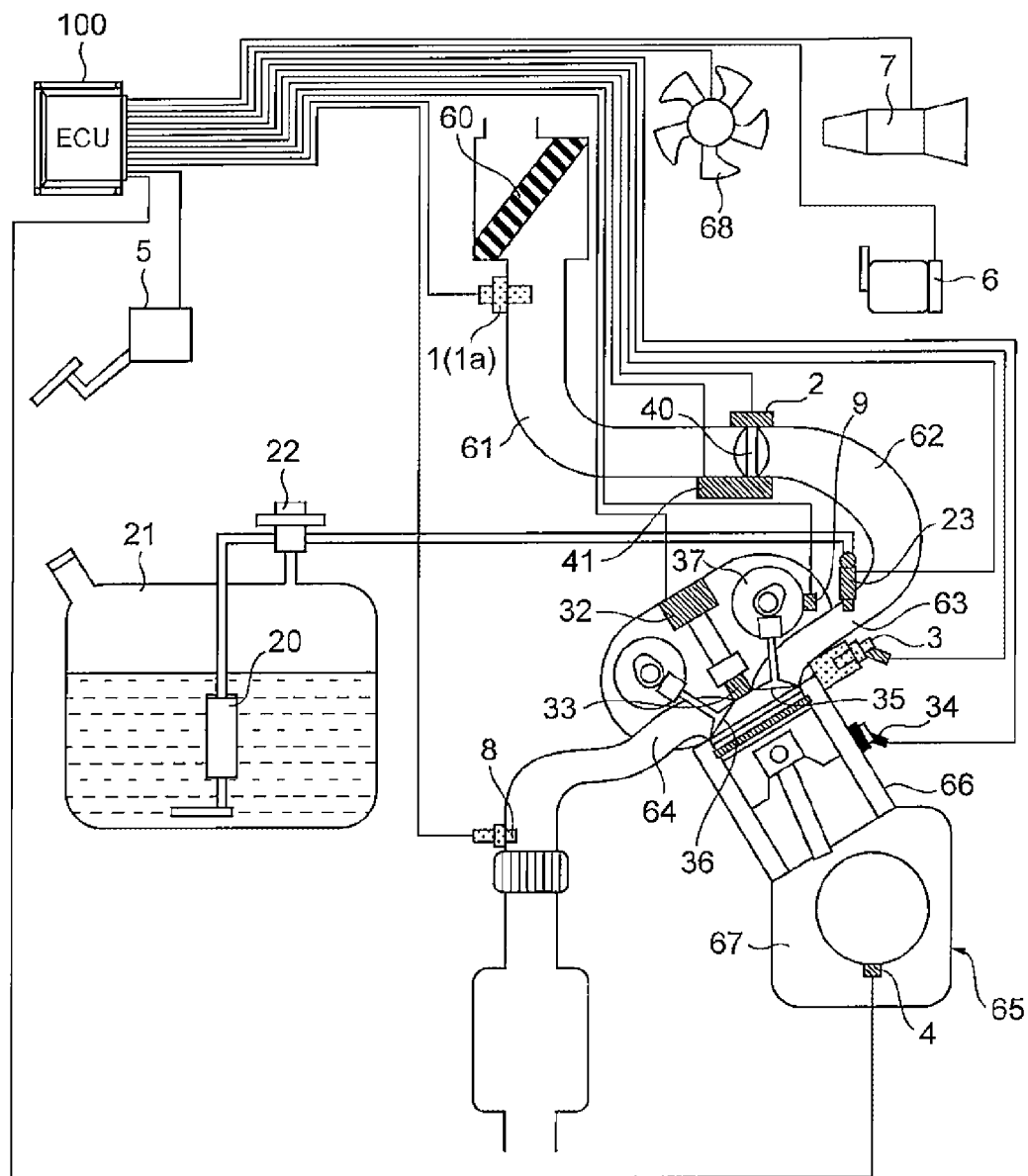
FIG. 1 is a system configuration diagram of an engine control system equipped with a control ECU as an embodiment of a signal processing device according to the present invention.

As an embodiment shown in FIG. 1, a so-called multi point injection (MPI) type in-line four-cylinder engine will be described.

Air sucked into an engine 65 passes through an air cleaner 60 and is guided to a hot wire type air flow sensor 1. A heat ray type air flow rate sensor is used for the hot wire type air flow sensor 1. A signal corresponding to the amount of intake air is output from the hot wire type air flow sensor 1, and an intake temperature signal measured by an intake temperature sensor 1a using a thermistor built in the hot wire type air flow sensor 1 is output. Next, the intake air passes through a duct 61 connected to the air cleaner 60 and a throttle valve 40 that controls an air flow rate, and enters a collector 62. The throttle valve 40 is provided with a throttle sensor 2 that detects an opening degree of the throttle valve 40, and the throttle valve 40 is operated by a throttle drive motor 41 driven by a control engine control unit (ECU) 100 as a signal processing device. The air that has entered the collector 62 is distributed to each intake pipe 63 that is directly connected to the engine 65, and is sucked into a cylinder 66 (combustion chamber) via an intake valve 35. A valve timing variable mechanism 37 with a cam angle sensor 9 is provided in the valve drive system of the intake valve 35 and an exhaust valve 36 to perform feedback control toward a target angle. Further, crank angle sensors 4 attached to cylinder blocks (hereinafter, sometimes referred to as engine blocks) 66, 67 output a pulse for each predetermined crank angle, and these outputs are input to the ECU 100.

The fuel is sucked from the fuel tank 21 and pressurized by a fuel pump 20, adjusted to a constant pressure by a pressure regulator 22, and injected into the intake pipe 63 from the injector 23 provided in the intake pipe 63.

By turning on/off an ignition output of a spark plug 33 at a timing corresponding to a rotation speed of the engine 65 and an ignition timing determined according to a load of the engine 65, discharge for ignition is performed at an optimum timing. If the ignition is too early, the knock occurs inside the combustion chamber (cylinder 66). Therefore, when the knock sensor 34 as a vibration sensor detects vibration of the cylinder 66 due to the knock and determines the knock, knock control to retard the ignition timing is performed.

A throttle sensor 2 for detecting the opening degree of the throttle valve 40 is attached to the throttle valve 40, and the sensor signal of the throttle sensor 2 is input to the ECU 100 to perform feedback control of the opening degree of the throttle valve 40, detect a fully closed position, detect acceleration, and the like. The target opening degree of feedback is determined from the accelerator depression amount of the driver determined by an accelerator opening sensor 5 and an amount of idle rotation speed control, that is, ISC control.

A water temperature sensor 3 that detects a cooling water temperature is attached to the engine 65, and the sensor signal of the water temperature sensor 3 is input to the ECU 100 to detect a warm-up state of the engine 65, increase a fuel injection amount from the injector 23, correct the ignition timing of the spark plug 33, and set on/off of a radiator fan 68 and the target rotation speed at idle. An air conditioner switch 6 that monitors a state of an air conditioner clutch, a neutral switch 7 built into a transmission that monitors a state of the drive system, and the like are attached to the engine 65 for calculating the target rotation speed at idle and the load correction amount.

An air-fuel ratio sensor 8 is mounted on an exhaust pipe 64 of the engine 65, and outputs a signal according to an oxygen concentration of exhaust gas discharged to the exhaust pipe 64 via the exhaust valve 36. This sensor signal is input to the ECU 100 and the fuel injection pulse width of the injector 23 is adjusted so that the target air-fuel ratio is obtained according to the operating conditions.

Figure 2:
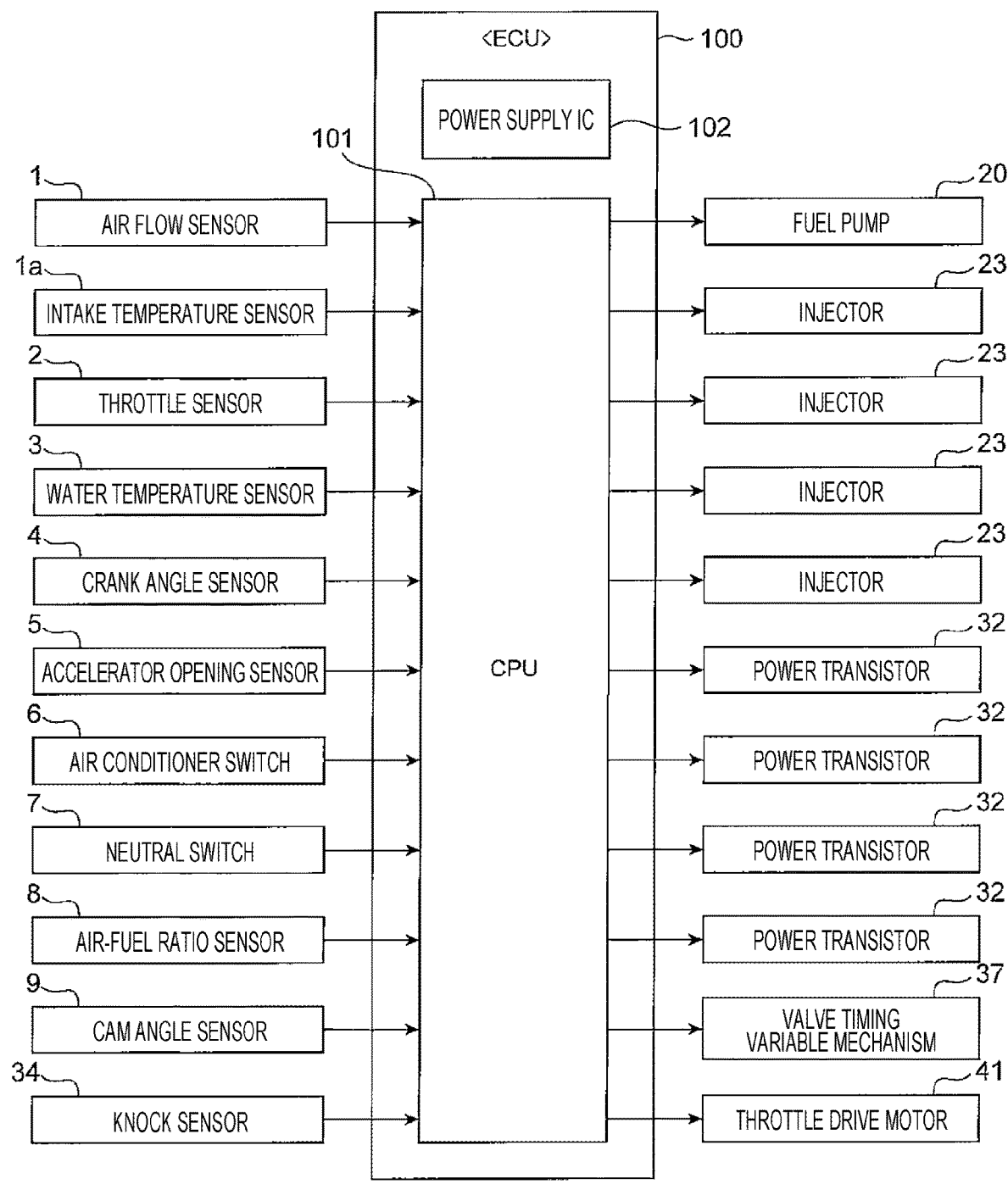
FIG. 2 is an internal configuration diagram of the control ECU shown in FIG. 1.

As shown in FIG. 2, the ECU 100 includes a microcomputer including a central processing unit (CPU) 101, a power supply IC 102, a random access memory (RAM) (not shown), a read only memory (ROM) (not shown), and the like. The CPU 101 of the ECU 100 executes various controls related to the operation of the engine 65 by executing various control programs stored in the ROM. Here, the signals to be input to the CPU 101 of the ECU 100 are summarized with reference to the drawing. Signals from the air flow sensor 1, the intake temperature sensor 1a built into the air flow sensor 1, the throttle sensor 2, the water temperature sensor 3, the crank angle sensor 4, the accelerator opening sensor 5, the air conditioner switch 6, the neutral switch 7, the air-fuel ratio sensor 8, the cam angle sensor 9, the knock sensor 34 and the like are input. The output signal from the CPU 101 of the ECU 100 is output to the fuel pump 20, the injector 23, a power transistor 32 having an ignition switch of the spark plug 33, the valve timing variable mechanism 37, the throttle drive motor 41, and the like. As described above, the signal of the knock sensor 34 mounted on the cylinder block 67 is input to the CPU 101, and the CPU 101 makes a knock determination to identify noise other than a knock and a knock, and at the time of the knock determination, the retard angle control of the ignition timing is performed, and correction is performed to suppress the occurrence of a knock.

The energization timing of the power transistor 32 is controlled on the basis of the target ignition timing for which this correction is performed.

FIG. 3 is a diagram showing the frequency analysis result of the pressure sensor output (the output of the pressure sensor that detects the pressure in the cylinder (inside the cylinder 66)) and the knock sensor output (the output of the knock sensor 34 that detects vibration of the cylinder 66 of the cylinder block 67) in the cycle in which the knock occurs. The vertical axis (knock intensity) in the upper drawing of FIG. 3 is the square of the output (pressure) of the pressure sensor, and the unit is [MPa^2]. The vertical axis (knock intensity) in the lower drawing of FIG. 3 is the square of the output (voltage) of the knock sensor 34, and the unit is [V^2].

As shown in FIG. 3, specific frequencies (Pf1, Pf2, Pf3) of the pressure wave, which is the root cause of the vibration, and specific frequencies (Kf1, Kf2, Kf3) of the knock sensor signal detected as the vibration of the cylinder blocks (66, 67) do not always match. This is because the result of the impact force input to the engine blocks (66, 67) when the pressure wave collides with the wall surface passes through the characteristics of the engine blocks (66, 67) and appears as a knock sensor output. In addition, the relationship between the values of frequency components is also different. That is, in the knock sensor 34, the signal intensities of the specific frequencies Kf1, Kf3 located at the positions sandwiching the Kf2 are smaller than the signal intensity of the central specific frequency Kf2.

This result is different from the relationship in which the signal intensity of Pf2, which is the central frequency in the pressure sensor, is smaller than the signal intensity of specific frequencies Pf1, Pf3 at positions sandwiching the frequency Pf2. As describe above, as the deviation of a specific frequency occurs, the magnitude relationship of the frequency component of the signal also changes. These changes are caused by the presence of the engine blocks (66, 67) that connect the in-cylinder pressure and the knock sensor. Therefore, the influence of the engine blocks (66, 67) can be evaluated from the relationship between the in-cylinder pressure and the knock sensor output as described above, and by using this, the characteristics of the in-cylinder pressure can be easily reproduced from the knock sensor signal.

When the states of the engine 65 (engine operating state) such as the cylinder number of the engine 65, the rotation speed of the engine 65, the load of the engine 65, and the cooling water temperature detected by the water temperature sensor 3 are the same, basically, a knock occurs at the same specific frequency (Kf1, Kf2, Kf3) of the knock sensor signal. When the above-mentioned engine operating states are the same, basically, a knock occurs at the specific frequency (Pf1, Pf2, Pf3) of the pressure wave determined by the pressure sensor attached to the inside of the cylinder 66.

Figure 4:
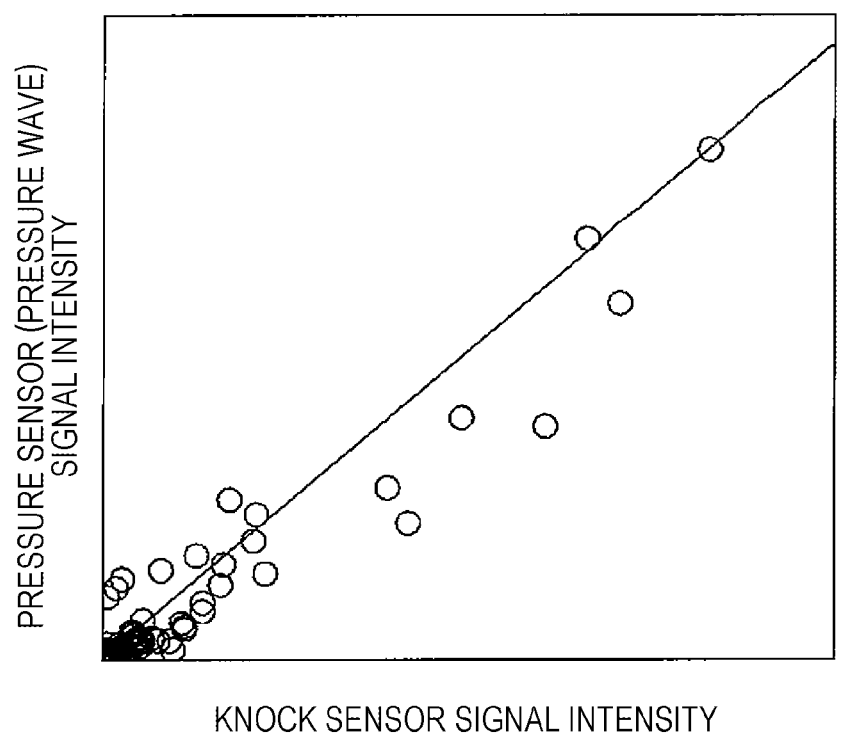
FIG. 4 is an explanatory diagram of a correlation between the knock intensity by the pressure sensor and the knock intensity by the knock sensor.

FIG. 4 shows the linear relationship between the signal value (signal intensity) of a specific frequency of the knock sensor signal and the signal value (signal intensity) of a specific frequency of the pressure sensor signal. In FIG. 4, the intensities P(Pf1), P(Pf2) of the pressure sensor signals of the specific frequencies Pf1, Pf2 in FIG. 3 and the intensities K(Kf1), K(Kf2) of the knock sensor signals of the specific frequencies Kf1, Kf2 are used to assume the relationship of Equation (1) below, and plot the values of multiple cycles.

[Equation 1]

$$P(Pf1)+P(Pf2)=K(Kf1)+2K(Kf2) \qquad (1)$$

That is, the knock intensity $K(Kfi)$ of the specific frequency of the knock sensor signal is corrected by the knock intensity $P(Pfi)$ of the specific frequency of the pressure sensor signal according to the change of the specific frequency due to the engine blocks (66, 67). In the above equation (1), K(Kf1) is corrected to P(Pf1) and K(Kf2) is corrected to P(Pf2). Further, in consideration of attenuation, the weighting coefficient of the low frequency component (K(Kf1)) of the knock sensor signal is set to 1, and the weighting coefficient of the high frequency component (K(Kf2)) is set to 2 to be large. As a result, the knock intensity (in-cylinder pressure intensity) of the specific frequency of the pressure sensor signal can be calculated from the knock intensity of the specific frequency of the knock sensor signal.

Therefore, in the present embodiment, the relationship with the specific frequencies (Pf1, Pf2, and the like) of the pressure wave corresponding to the specific frequencies (Kf1, Kf2, and the like) of the knock sensor signal is stored in RAM or ROM for each engine operating state. Then, as described above, the weighting coefficients for calculating the knock intensity P(Pfi) of the specific frequency of the pressure sensor signal from the knock intensity K(Kfi) of the specific frequency of the knock sensor signal are stored in the RAM or ROM. As a result, the CPU 101 of the ECU 100 uses the relationship between the specific frequencies (Kf1, Kf2, and the like) of the knock sensor signal and the specific frequencies (Pf1, Pf2, and the like) of the pressure wave, and the weighting coefficient that are stored in the RAM or ROM to calculate the knock intensity (in-cylinder pressure intensity, P(Pfi)) of a specific frequency of the pressure sensor signal from the knock sensor signal. Then, the CPU 101 determines the presence or absence of the knock on the basis of the knock intensity (in-cylinder pressure intensity) of the calculated pressure sensor signal at a specific frequency.

Knock Determination and Knock Control by ECU in the Present Embodiment

Figure 5:
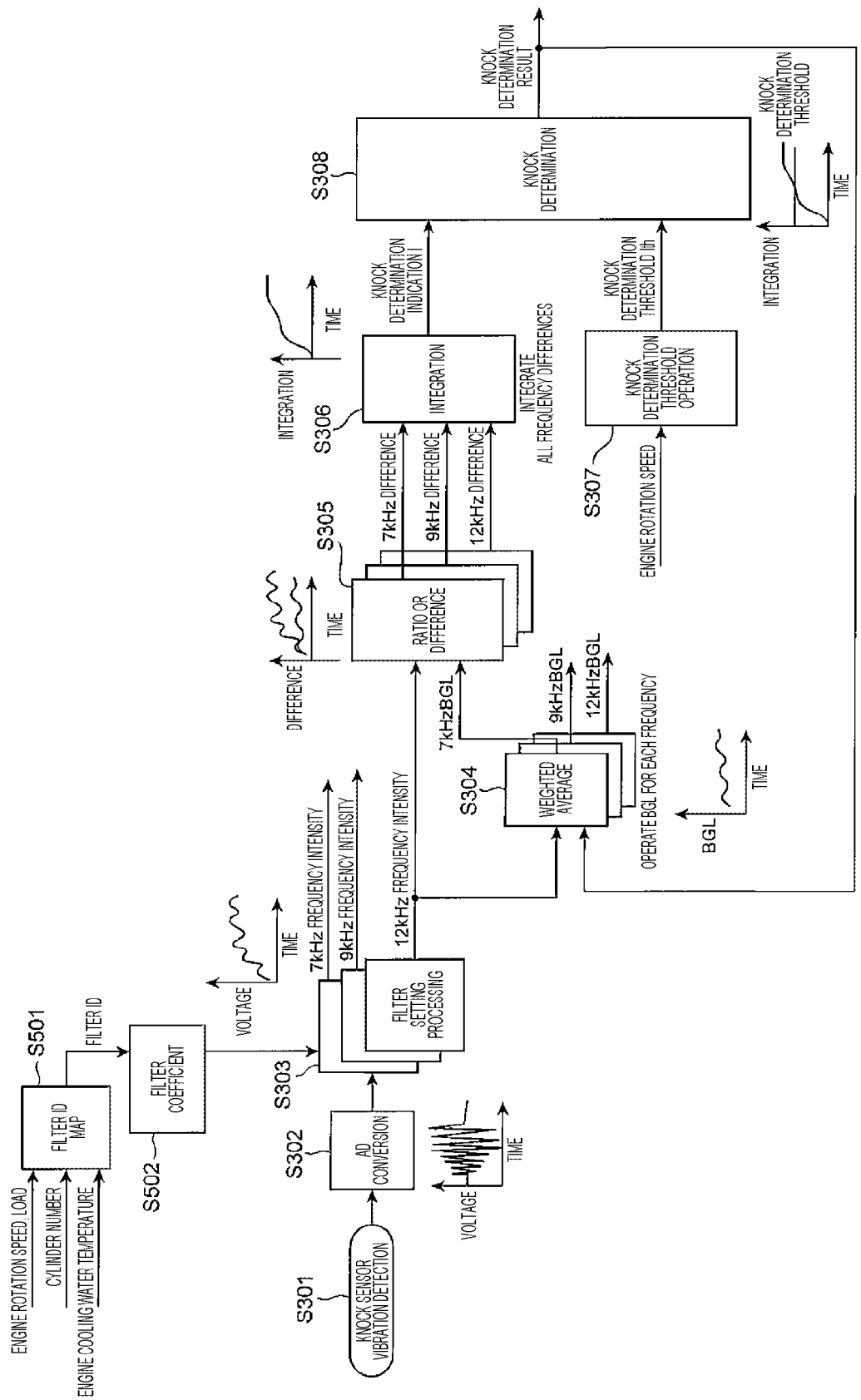
FIG. 5 is an operation chart for explaining a procedure of knock determination and knock control by an ECU in the present embodiment.

FIG. 5 is an operation chart for explaining a procedure for determining the presence or absence of the knock in the present embodiment. It is assumed that each step in FIG. 5 is performed by the CPU 101 of the ECU 100. Hereinafter, the processing of each operation block in FIG. 5 will be described.

In the present embodiment shown in FIG. 5, setting of the frequency band (cutoff frequency or pass band) detected by the knock detection filter is performed according to the state of the engine 65 (engine operating state) such as the cylinder number of the engine 65, the rotation speed of the engine 65, the load, and the cooling water temperature detected by the water temperature sensor 3.

More specifically, the RAM or ROM of the ECU 100 stores a filter ID map in which a plurality of filters described later having different cutoff frequencies or pass bands are registered as individual codes. Then, the CPU 101 selects the corresponding filter ID from the filter ID map according to the engine operating state described above (S501). The filter ID map will be described later, but this filter ID is associated with a filter coefficient with which the filter characteristics are set. Therefore, by selecting the filter ID from the filter ID map, it is possible to set the knock detection filter in which the frequency band (cutoff frequency or pass band) and attenuation band corresponding to the filter ID are determined (S502).

The knock sensor 34 detects the vibration of the engine 65 (S301), and the AD converter converts the detection result into a digital signal (S302). The knock sensor output of the knock sensor 34 is output as a signal in a desired frequency band by the knock detection filter set in S501. Here, a knock detection filter (bandpass filter) having a cutoff frequency or passband whose resonance frequency (specific frequency) is 7 kHz, 9 kHz, or 12 kHz is set in association with the selected filter ID, and three frequency components that have passed the knock detection filter are exemplified. That is, the CPU 101 processes the knock sensor output signal of the knock sensor 34 by using the knock detection filter set by selecting the filter ID in S501. Then, the CPU 101 calculates the knock intensity K(Kfi) of each resonance frequency (Kfi) from the output of the knock detection filter (S303).

Here, as described above, the CPU 101 uses the relationship between the specific frequencies (Kf1, Kf2, and the like) of the knock sensor signal and the specific frequencies (Pf1, Pf2, and the like) of the pressure wave, and the weighting coefficient that are stored in the RAM or ROM to calculate the knock intensity (in-cylinder pressure intensity) of a specific frequency of the pressure sensor signal from the knock sensor signal.

That is, the CPU 101 calculates the specific frequency (Pfi) of the pressure wave corresponding to the specific frequency (7 kHz, 9 kHz, 12 kHz) of the knock sensor signal on the basis of the engine operating state such as the engine rotation speed and the load. Further, the CPU 101 calculates the weighting coefficient corresponding to the engine operating state, and calculates the knock intensity (P(Pfi)) of the specific frequency of the pressure sensor signal on the basis of the correspondence between the weighting coefficient and the above-mentioned specific frequency (Pfi) (S303).

The CPU 101 calculates the weighted average of the background level (BGL1, . . . , BGLi) for each specific frequency (7 kHz, 9 kHz, 12 kHz) (S304). Next, the CPU 101 calculates the ratio SLi=Pfi/BGLi of the knock intensity (Pfi) calculated above to the background level BGLi for each specific frequency (7 kHz, 9 kHz, 12 kHz) (S305). The CPU 101 integrates SLi=P (Pfi)/BGLi for each specific frequency (7 kHz, 9 kHz, 12 kHz). In other words, when there are m specific frequencies, by calculating $$\Sigma_{i=1}^{m} SLi$$

a knock determination indication is calculated (S306). In S305, the method of taking each ratio has been described, but this is not limited to the ratio, and the knock determination indication I may be determined by calculating the difference and integrating the difference.

The CPU 101 determines a knock determination threshold Ith on the basis of a rotation speed Ne of the engine 65 (S307). Specifically, the CPU 101 refers to map data (data table) in which the rotation speed Ne of the engine 65 (the operating state of the engine 65) and the knock determination threshold are associated in advance, and determines the knock determination threshold Ith from rotation speed Ne of the engine 65. The CPU 101 determines the presence or absence of the knock by comparing a knock indication I with the knock determination threshold Ith, and outputs the knock determination result (S308).

Figure 6:
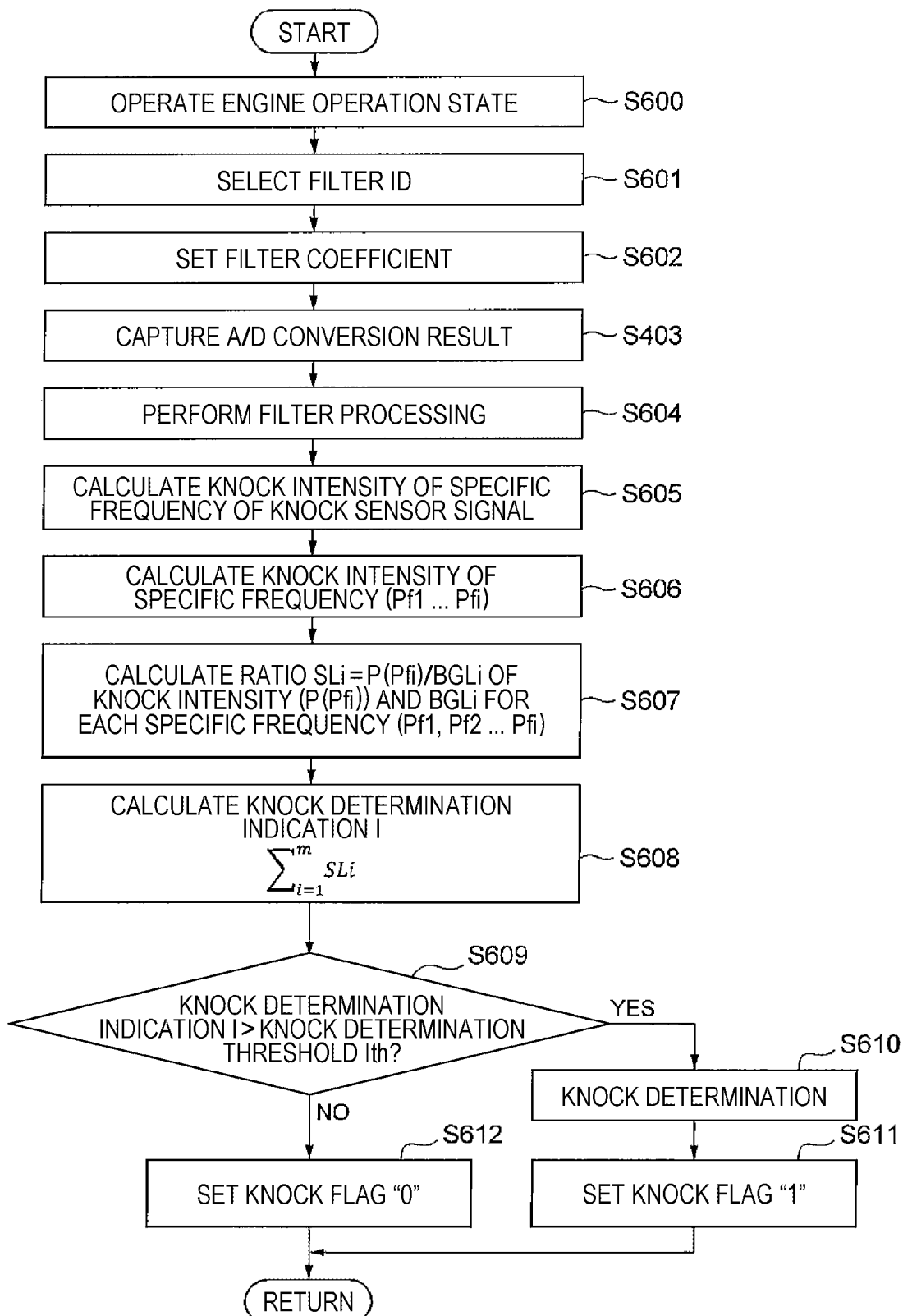
FIG. 6 is an operation flowchart for explaining the procedure of the knock determination and the knock control according to FIG. 5.

FIG. 6 is an operation flowchart for explaining the knock determination and the knock control procedure in the present embodiment, which have been described on the basis of FIG. 5.

Correspondingly to S501 of FIG. 5, the CPU 101 performs operation of the engine operating state (which may be referred to as the engine operating condition) by detecting signals indicating the state of the engine 65 such as the cylinder number of the engine 65, the rotation speed of the engine 65, the load, and the cooling water temperature detected by the water temperature sensor 3 (S600). Next, correspondingly to S502 of FIG. 5, the CPU 101 selects a filter ID from the filter ID map on the basis of the engine operating state (S601). The RAM or ROM of the ECU 100 stores a filter ID map described later and a filter coefficient corresponding to each filter ID. Therefore, by selecting the filter ID in S601, the CPU 101 sets the knock detection filter such as the desired frequency band (cutoff frequency or pass band) and attenuation band using the corresponding filter coefficient (S602).

Thereafter, correspondingly to S301 and S302 of FIG. 5, the CPU 101 A/D-converts the knock signal from the knock sensor 34 and captures the A/D conversion result (S603). Further, correspondingly to S303 of FIG. 5, the CPU 101 performs filtering processing on the A/D-converted knock signal using the knock detection filter set in S602 (S604). Further, the CPU 101 calculates the knock intensity at a specific frequency of the knock sensor signal on the basis of the filtered knock signal (S605). Here, in the present embodiment, the relationship with the specific frequencies (Pf1, Pf2, and the like) of the pressure wave corresponding to the specific frequencies (Kf1, Kf2, and the like) of the knock sensor signal is stored in RAM or ROM for each engine operating state. As a result, the CPU 101 uses the relationship between the specific frequencies (Kf1, Kf2, and the like) of the knock sensor signal and the specific frequencies (Pf1, Pf2, and the like) of the pressure wave, and the weighting coefficient that are stored in the RAM or ROM to calculate the knock intensity (in-cylinder pressure intensity, P(Pfi)) of a specific frequency of the pressure sensor signal from the knock sensor signal (S606). Although, in the present embodiment, as described above, the relationship between the specific frequencies (Kf1, Kf2, and the like) of the knock sensor signal and the specific frequencies (Pf1, Pf2, and the like) of the pressure wave, and the weighting coefficient that are stored in the RAM or ROM is used to calculate the knock intensity (in-cylinder pressure intensity) of a specific frequency of the pressure sensor signal, the present invention is not limited to this. That is, without this conversion, it is also possible to perform subsequent knock determination using the knock intensity (K(Kfi)) of a specific frequency (Kf1, Kf2, and the like) of the knock sensor signal.

Also, in relation to S305 of FIG. 5, the CPU 101 calculates the ratio of the background level weighted average (BGLi) to the knock intensity (P(Pfi)) for each specific frequency (Pfi), SLi=P (Pfi)/BGLi (S607). Further, in relation to S306 of FIG. 5, when the number of specific frequencies is m, the CPU 101 calculates $$\Sigma_{i=1}^{m} SLi$$

to calculate the knock determination indication I (S608).

Then, when the knock determination indication I is larger than the knock determination threshold Ith (S609), it is determined that a knock has occurred (S610), and a knock flag "1" is set (S611). On the other hand, when the knock determination indication I is equal to or less than the knock determination threshold Ith (S609), the knock flag is set to "0" (S612). When the knock flag becomes 1, the CPU 101 performs control so that knock does not occur by retarding the ignition timing of the spark plug 33.

Filter Setting/Selection by ECU in the Present Embodiment

Figure 7:
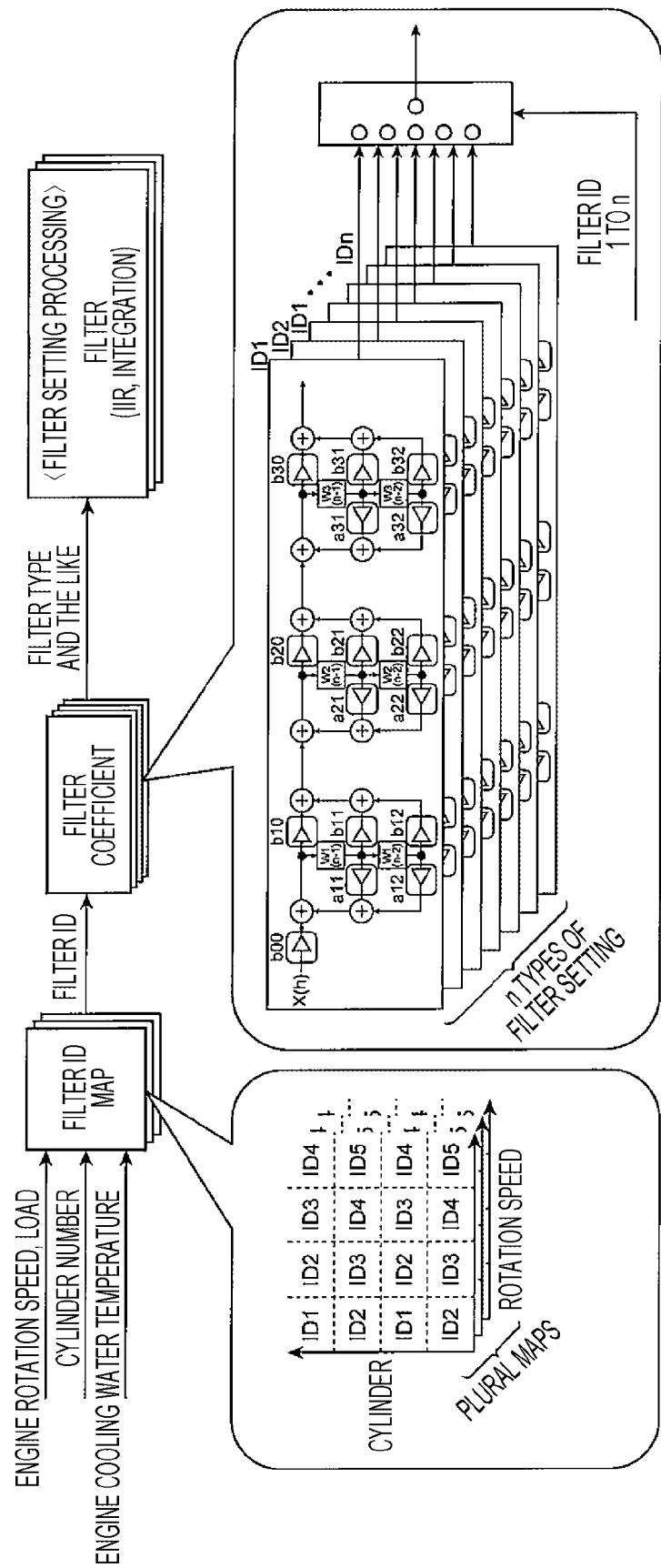
FIG. 7 is an explanatory diagram of an example of filter setting control by the ECU in the present embodiment.

FIG. 7 shows an example of a filter setting control example by the CPU 101 of the ECU 100 in the present embodiment.

As described in FIGS. 5 and 6, the RAM or ROM of the ECU 100 stores a filter ID map of FIG. 7 in which a plurality of filters described later having different cutoff frequencies or pass bands are registered as individual codes (ID1, ID2, ID3, ID4, ID5, ID6). Then, the CPU 101 selects the corresponding filter ID from the filter ID map according to the engine operating state (the cylinder number of the engine 65, the rotation speed of the engine 65, the load, the cooling water temperature detected by the water temperature sensor 3, and the like). The filter ID is associated with a filter coefficient with which the filter characteristics are set. Therefore, by selecting the filter ID from the filter ID map, it is possible to set the knock detection filter in which the frequency band (cutoff frequency or pass band) and attenuation band corresponding to the filter ID are determined.

FIG. 7 shows an example of a three-stage secondary IIR filter as a filter ID1. For the first-stage secondary IIR filter of FIG. 7, filter coefficients such as a11, a12, w1(n-1), w1(n-2), b00, b10, b11, b12 are set. Similarly, filter coefficients are set for the second-stage and third-stage IIR filters. With these filter coefficients, the filter characteristics such as the frequency band (cutoff frequency or pass band) of signal that is allowed to pass through, or the attenuation bands is determined. Then, the CPU 101 processes the detection signal of the knock sensor by using the knock detection filter whose filter characteristics are determined by the filter type (IIR filter, FIR filter, and the like) and the filter coefficient associated with the selected filter ID.

That is, the required filter characteristics are different depending on the engine operating state such as the cylinder number of the engine 65, the rotation speed of the engine 65, the load, the cooling water temperature detected by the water temperature sensor 3, and the like. Therefore, in the present embodiment, the filter ID is associated with the filter type and the filter coefficient in advance, and the CPU 101 can select a preset filter ID according to the engine operating state. As a result, the filter type and the filter coefficient are set so that the desired filter characteristics associated with the filter ID is obtained, and thereby, the knock determination can be performed using the knock detection filter.

In the above, the point of associating the filter characteristics with the filter ID has been explained, but since desired relationship between the above-mentioned specific frequency of the knock sensor signal (Kf1, Kf2, and the like) and the specific frequency of the pressure wave (Pf1, Pf2, and the like) and weighting coefficient are determined depending on the engine operating state, setting of these in association with the filter ID may be enabled. That is, when the CPU 101 selects the filter ID on the basis of the engine operating state, the relationship between the specific frequency of the knock sensor signal (Kf1, Kf2, and the like) and the specific frequency of the pressure wave (Pf1, Pf2, and the like), or a weighting coefficient is set correspondingly to the filter ID. As a result, the CPU 101 can accurately detect a knock on the basis of desired relationship between the specific frequency of the knock sensor signal (Kf1, Kf2, and the like) and the specific frequency of the pressure wave (Pf1, Pf2, and the like), or weighting coefficient.

In the ECU 100 of the present embodiment, the filter type and filter coefficient are stored in the RAM or the ROM for each filter so that a plurality of filters having different desired frequency bands (cutoff frequency or pass band) are obtained, in advance. It is desirable that the desired frequency band (cutoff frequency or pass band), that is, the filter characteristics, be set so that knock detection can be performed accurately in a general engine. Then, the ECU 100 of the present embodiment includes a function of, with respect to this filter characteristic (cutoff frequency or pass band), storing only the filter type and the filter coefficient for satisfying the filter characteristic (cutoff frequency or pass band) in advance in the RAM or the ROM, and associating the filter ID with the filter characteristic (cutoff frequency or pass band). As a result, the person who performs matching processing of the ECU 100 can complete the matching processing by setting only which filter ID (that is, which filter characteristic) is to be associated to which engine operating state. Therefore, since it is not necessary to set the filter type and the filter coefficient, which are complicated, it is possible to provide an ECU capable of easily performing the matching processing.

Figure 8:
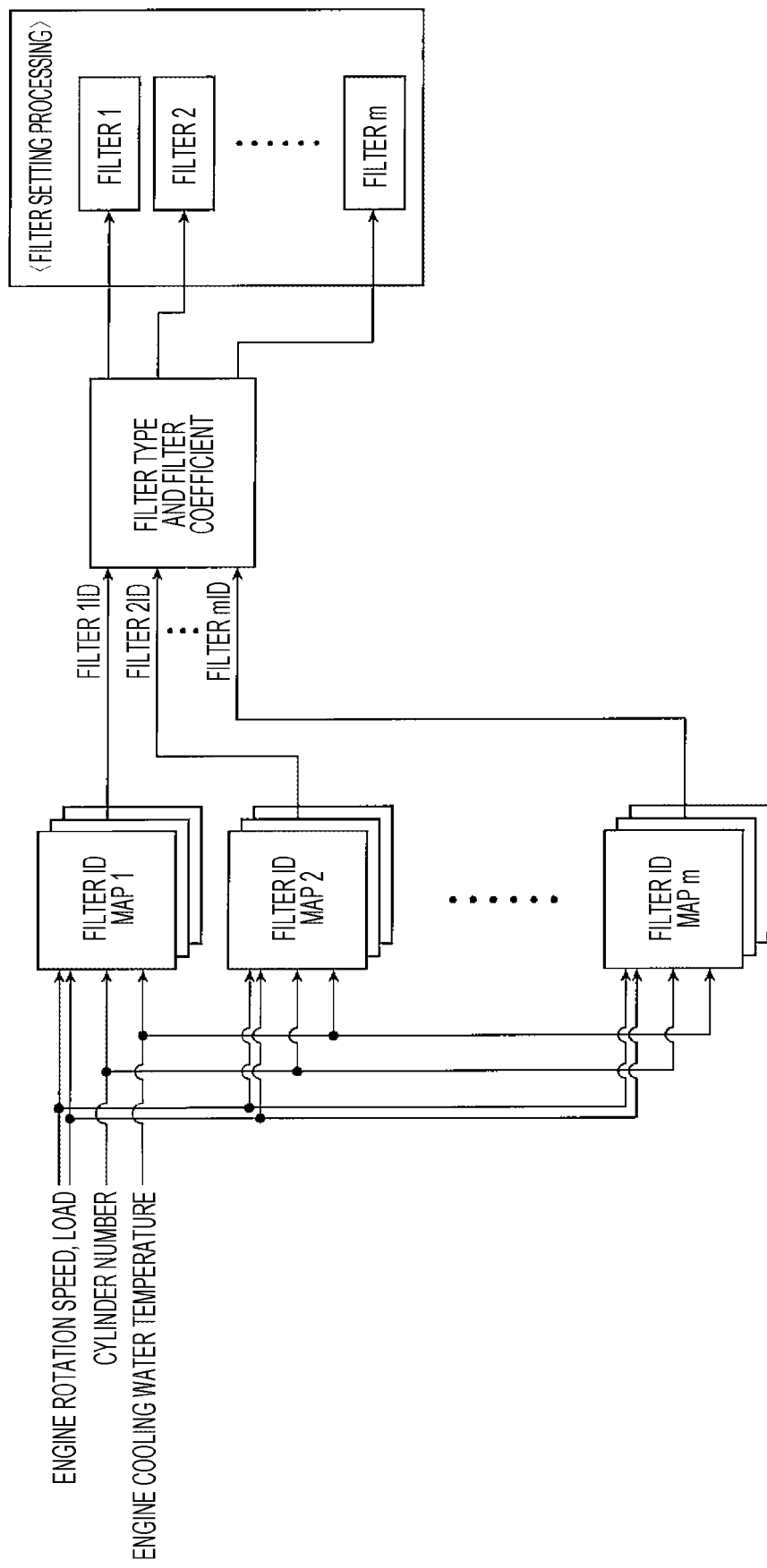
FIG. 8 is an explanatory diagram of an example of filter setting control by the ECU in the present embodiment.

As shown in FIG. 8, the filter ID map is divided into a plurality of filter ID maps for each filter channel. Therefore, for the CPU 101, the filter ID map is first selected on the basis of the engine operating state, and then the corresponding filter ID is selected from the selected filter ID map. In FIG. 8, it is assumed that there are m filter ID maps, and filter IDs are shown as filter 1ID to filter mID. When the filter ID is selected, the corresponding filter type and filter coefficient are set, and this completes the filter setting processing of determining which filter is to use from filters 1 to m.

Figure 9:
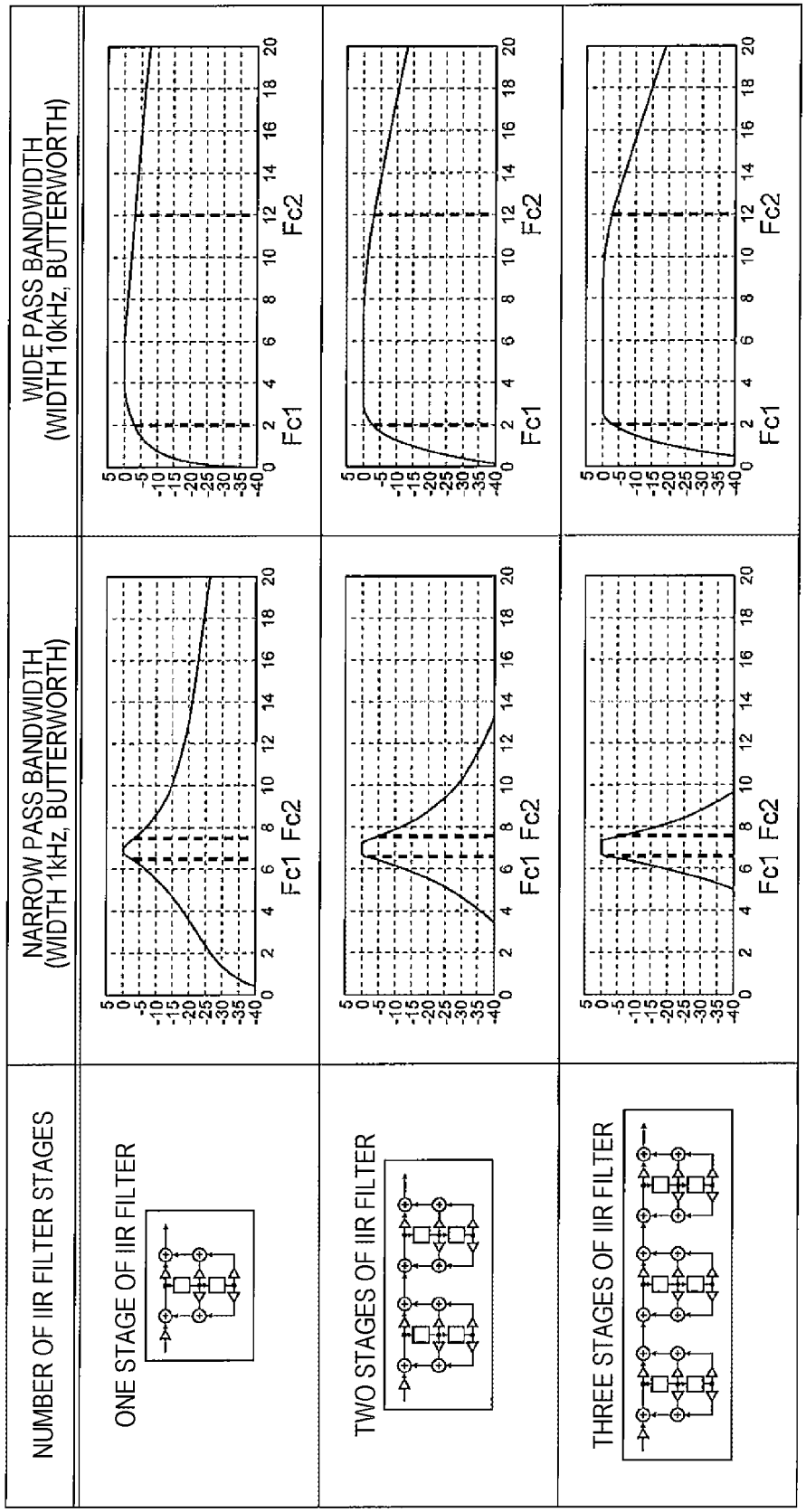
FIG. 9 is an explanatory diagram of a filter selection example by the ECU in the present embodiment.

FIG. 9 shows an example of a filter that can be selected by the CPU 101 of the ECU 100 in the present embodiment, and shows an example of a filter of the filter type that can be selected by the filter ID map of FIGS. 7 and 8. Here, an example of filter characteristics for each number of IIR filter stages is shown. As is clear from FIG. 9, it can be seen that the larger the number of stages of the filter, the steeper the characteristics of the filter. By appropriately setting the filter coefficient, it is possible to change the cut frequency (Fc1, Fc2), that is, the pass band.

Figure 10:
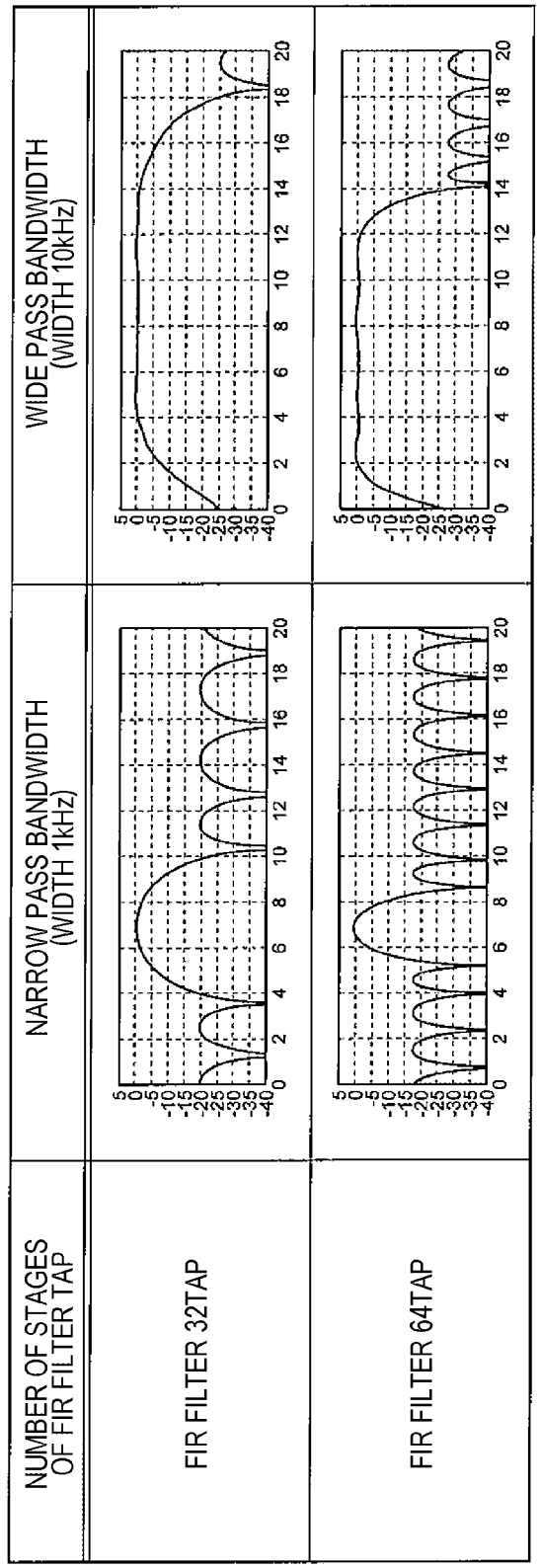
FIG. 10 is an explanatory diagram of a filter selection example by the ECU in the present embodiment.

FIG. 10 shows another example of a filter that can be selected by the CPU 101 of the ECU 100 in the present embodiment, and shows an example of a filter of the filter type that can be selected by the filter ID map of FIGS. 7 and 8. Here, an example of filter characteristics for each number of FIR filter TAP stages is shown. As is clear from FIG. 10, it can be seen that the larger the number of stages of the filter, the narrower the pass bandwidth of the filter.

Figure 11:
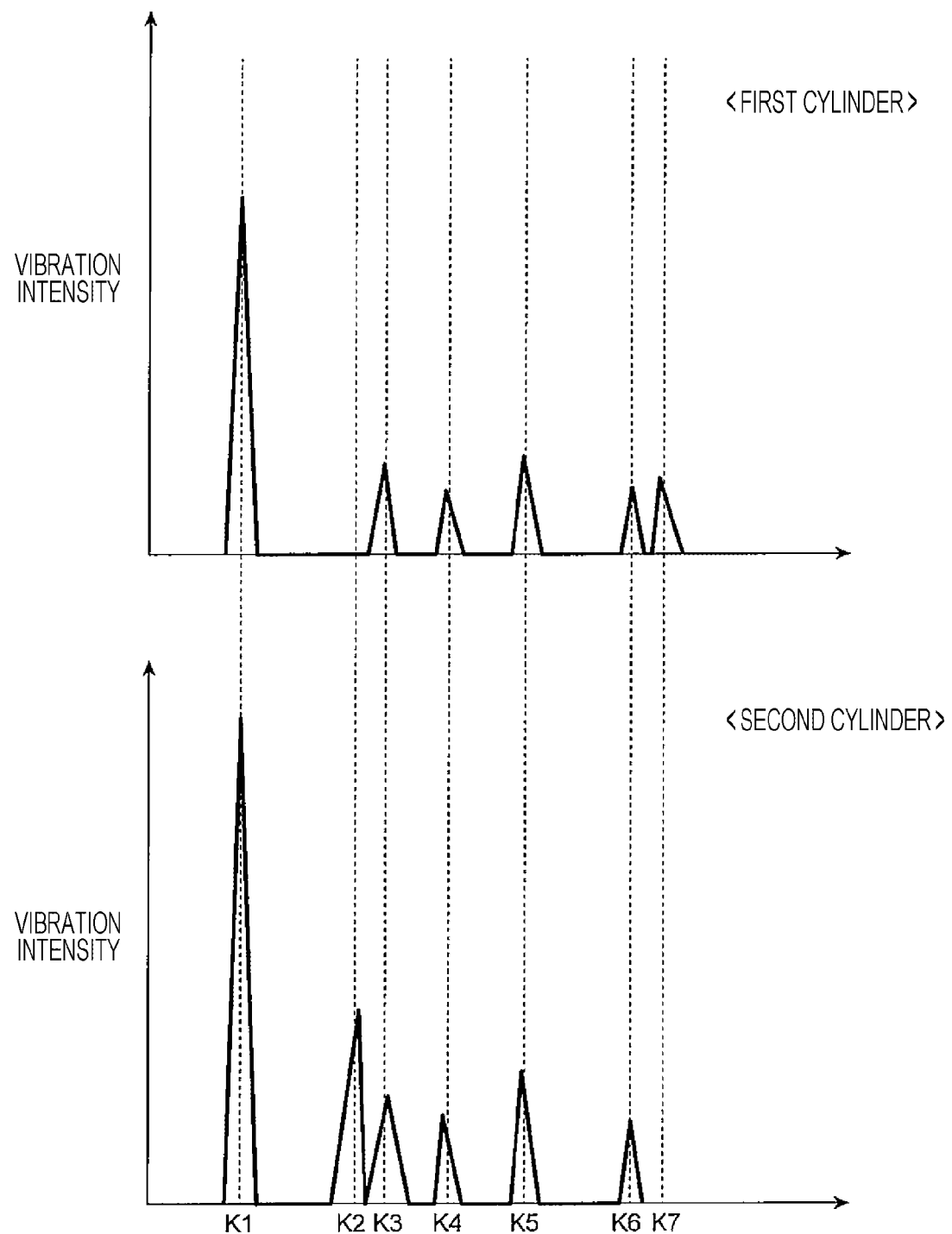
FIG. 11 is an explanatory diagram of necessity of a filter switching function for each cylinder by the ECU in the present embodiment.

FIG. 11 is a diagram showing a specific frequency and signal intensity of the knock sensor signal for each cylinder in which knock occurs, and is a diagram for explaining the necessity of the filter switching function for each cylinder described above.

As shown in FIG. 11, for example, the frequency K2 is a specific frequency found only in the second cylinder, and the frequency K7 is a specific frequency found only in the first cylinder. The characteristics of from the cylinder in which a knock occurs to the knock sensor are different from cylinder to cylinder. Such a difference occurs because the characteristics depend on the distance, the path, the shape of the path, and the like through which the vibration given to the engine blocks (66, 67) by the pressure wave passes. For example, it is necessary to perform signal correction in consideration of the characteristics of the engine blocks (66, 67) by changing the specific frequency selected for each cylinder.

In the present embodiment, as described above, the filter characteristics can be set in consideration of the characteristics of the engine blocks (66, 67) corresponding to each cylinder. That is, in the present embodiment, the cylinder number of the engine 65 is input to the CPU 101 as one of the engine operating states, and the filter ID is set so as to obtain the desired filter characteristics on the basis of the cylinder number. As a result, the CPU 101 selects a filter ID on the basis of the cylinder number during operation, and a knock detection filter having a filter characteristic desired for the cylinder number associated with the filter ID is set. Therefore, the conversion from pressure to vibration can be handled appropriately, and the pressure wave intensity can be predicted more precisely.

Figure 12:
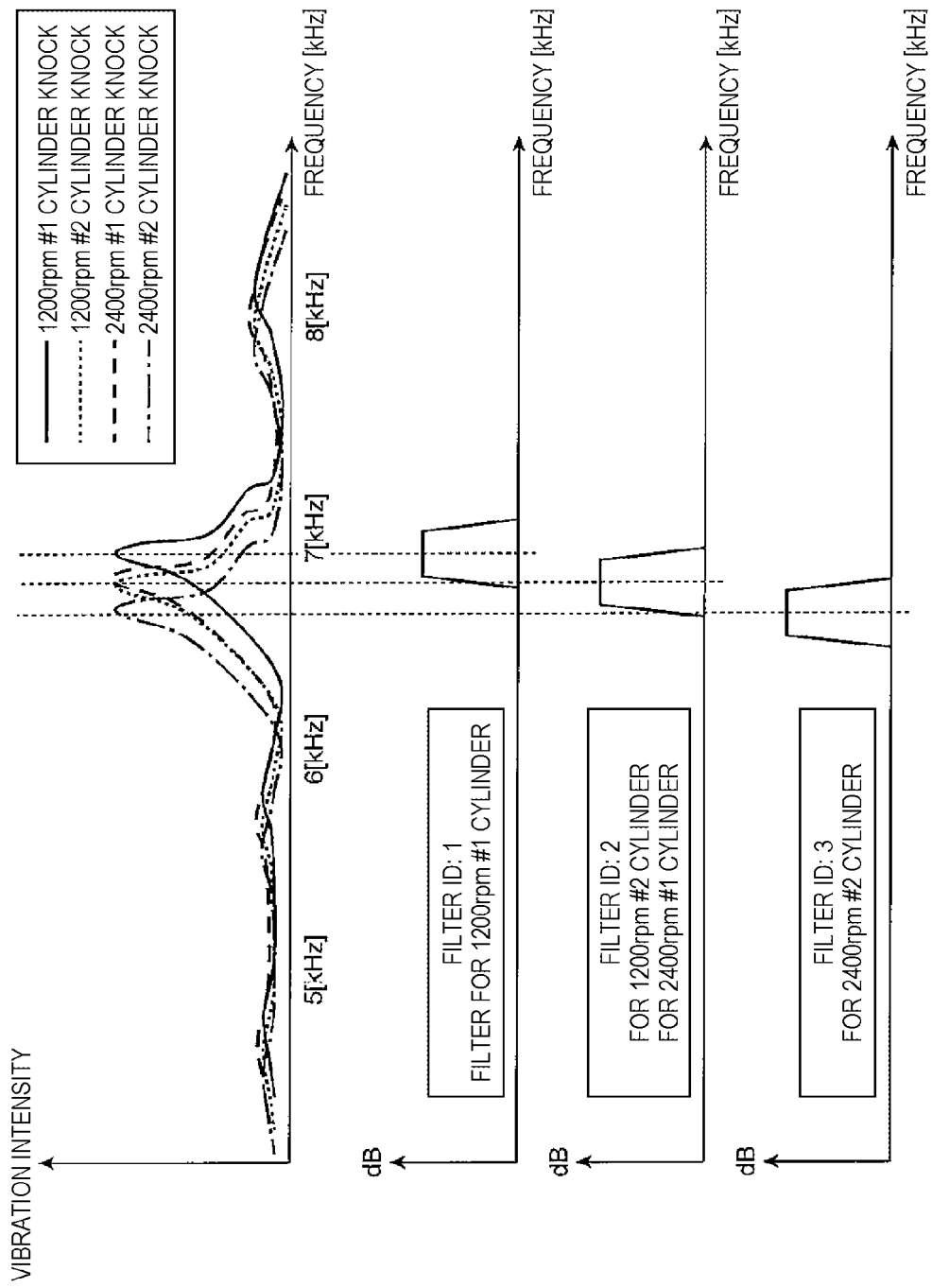
FIG. 12 is an explanatory diagram of a relationship between an engine state, a cylinder number, and a knock occurrence frequency, and filter setting by the ECU in the present embodiment.

FIG. 12 shows an example of the relationship between the state of the engine 65, the cylinder number, and the knock occurrence frequency, and the concept of filter setting by the CPU 101 of the ECU 100 in the present embodiment, and is a graph in which the frequency analysis result of one-cylinder and two-cylinder of 1200 rpm, and one-cylinder and two-cylinder of 2400 rpm.

As can be seen from the graph in FIG. 12, it can be seen that two-cylinder of 1200 rpm and one-cylinder of 2400 rpm have peaks at almost the same frequency. In a filter setting method in such a case, the filter requirements of the two-cylinder of 1200 rpm and the one-cylinder of 2400 rpm are the same, and they can be integrated so that a filter with the same filter ID can be used. Therefore, it is possible to easily set a complicated filter coefficient.

FIG. 13 is an example of a relationship between a state of the engine 65, a cylinder number, and a knock occurrence frequency, and filter setting by the CPU 101 of the ECU 100 in the present embodiment.

As can be seen from the table in FIG. 13, since there are a plurality of the same frequencies in the table, it is easy to set the filter by setting the same filter ID for that part.

Figure 14:
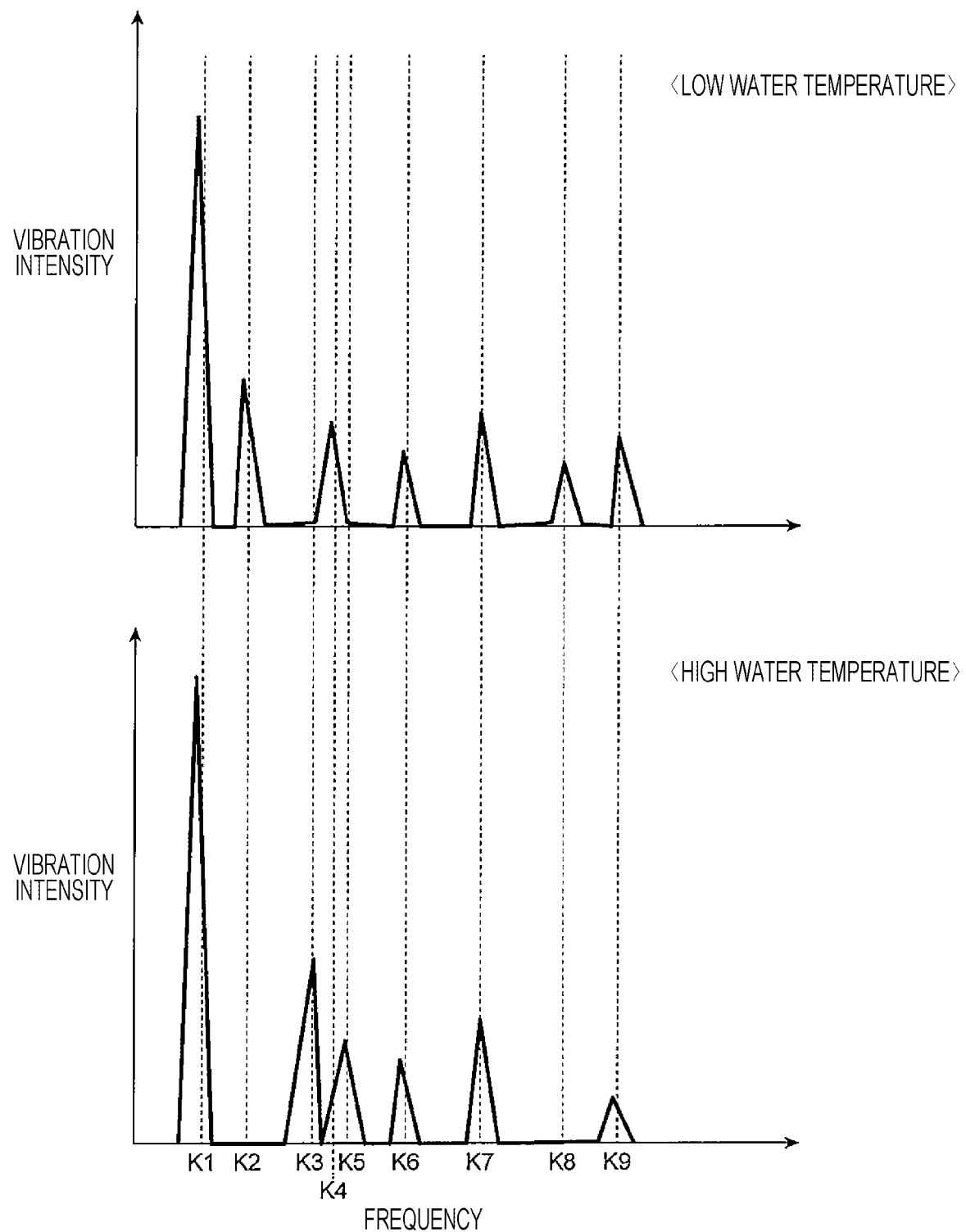
FIG. 14 is an explanatory diagram of necessity of a filter switching function for the relationship between the engine state and the knock occurrence frequency by the ECU in the present embodiment.

FIG. 14 is a diagram for explaining the necessity of the filter switching function for the relationship between the state of the engine 65 and the knock occurrence frequency by the CPU 101 of the ECU 100 in the present embodiment, and is a diagram showing a specific frequency and a signal intensity of a knock sensor signal for each cooling water temperature when a knock occurs.

As shown in FIG. 14, for example, frequencies K2, K4, K8 are specific frequencies found only at low water temperatures, and frequencies K3, K5 are specific frequencies found only at high water temperatures. The cooling water temperature at the time when a knock occurs changes the specific frequency of the pressure wave due to the change in the in-cylinder temperature, and also changes the characteristics of the engine block. The change in the characteristics of the engine block is considered to be due to the change in the speed of sound in water due to the temperature change. As a result, the specific frequency that appears as the signal of the knock sensor 34 changes. For example, it is necessary to perform signal correction in consideration of the characteristics of the engine block that change depending on the cooling water temperature by changing the specific frequency selected for each cooling water temperature. In the present embodiment, as described above, the filter characteristics are set in consideration of the characteristics of the engine block corresponding to each cooling water temperature.

That is, in the present embodiment, the cooling water temperature is input to the CPU 101 as one of the engine operating states, and the filter ID is set so as to obtain the desired filter characteristics on the basis of the cooling water temperature. As a result, the CPU 101 selects a filter ID on the basis of the cooling water temperature, and a knock detection filter having a filter characteristic desired for the cooling water temperature associated with the filter ID is set. As a result, the conversion from pressure to vibration can be handled appropriately, and the pressure wave intensity can be predicted more precisely.

FIG. 15 is an example of a relationship between a state of the engine 65, a cylinder number, and a knock occurrence frequency, and filter setting by the CPU 101 of the ECU 100 in the present embodiment.

As can be seen from the table in FIG. 15, since there are a plurality of the same frequencies in the table, it is easy to set the filter by setting the same filter ID for that part.

FIG. 16 shows a functional block diagram of the CPU 101 in which the knock sensor signal is detected, the knock sensor signal is corrected for each cylinder, and operation of the knock intensity is performed.

As described above, the signal detected by the knock sensor 34 is corrected in consideration of the influence of the engine block (knock sensor signal correction), but here, the cylinder number of the engine 65 or the cooling water temperature in each cylinder is used as the input signal of the CPU 101, and the corresponding filter ID is selected. Then, the knock sensor signal is processed by the knock detection filter of the filter characteristic associated with the filter ID, and the knock intensity (pressure wave intensity) is calculated on the basis of the processing result.

As described above, the signal processing device (ECU 100) of the present embodiment filters the output signal from the sensor (knock sensor 34) mounted on the vehicle. Further, in the signal processing device (ECU 100) of the present embodiment, setting is performed for a plurality of filters having different filter type (IIR filter, FIR filter, and the like) or filter coefficient (a11, a12, w1(n-1), w1 (n-2), b00, b10, b11, b12 and the like) in FIG. 7) for setting the cutoff frequency or the filter characteristic of the pass band It is set for multiple filters with different n-1), and an individual code (filter ID) is set for each of the plurality of filters. Then, in the signal processing device (ECU 100) of the present embodiment includes the CPU 101 that selects an individual code (filter ID) on the basis of the engine operating state to select a corresponding filter, and processes an output signal from a sensor (knock sensor 34) using the selected filter. It is desirable that the sensor be the knock sensor 34 that detects a knock of the engine 65 mounted on the vehicle.

It is desirable that the CPU 101 calculate the knock intensity (K(Kfi)) of a specific frequency of the knock sensor signal on the basis of the signal processed by the selected filter. Further, it is desirable that the signal processing device (ECU 100) include a storage unit (a RAM or ROM not shown) that stores the relationship with the specific frequency (Pfi) of the pressure wave in the cylinder corresponding to the specific frequency (Kfi) of the knock sensor signal for each engine operating state, and the CPU 101 calculate the knock intensity (K(Kfi)) of a specific frequency of the knock sensor signal on the basis of the signal processed by the selected filter, and use the relationship between the specific frequency (Kfi) of the knock sensor signal and the specific frequency (Pfi) of the pressure wave stored in the storage unit and the weighting coefficient to calculate the knock intensity (P(Pfi)) of a specific frequency of a pressure sensor signal for detecting the pressure wave in the cylinder from the knock sensor signal.

Further, in the above, it is desirable that, when an individual code (filter ID) is set for the relationship between the specific frequency (Kfi) of the knock sensor signal and the specific frequency (Pfi) of the pressure wave, and the weighting coefficient, and the CPU 101 selects an individual code (filter ID) on the basis of the engine operating state, the relationship between the specific frequency (Kfi) of the knock sensor signal and the specific frequency (Pfi) of the pressure wave, or the weighting coefficient corresponding to the individual code be set.

It is desirable that, when the CPU 101 calculates the ratio of background level weighted average (BGLi) to knock intensity (P(Pfi)) for each specific frequency (Pfi), SLi=P (Pfi)/BGLi, and there are m specific frequencies, the CPU 101 calculate $$\Sigma_{i=1}^{m} SLi$$

to calculate the knock determination indication I, and determine that a knock has occurred when the knock determination indication is larger than the knock determination threshold Ith. It is desirable that the engine operating state be at least one of the cylinder number of the engine 65, the rotation speed of the engine 65, the load of the engine 65, or the cooling water temperature detected by the water temperature sensor 3.

As described above, in the present embodiment, the engine control device (ECU 100) that controls the engine 65 including a sensor (knock sensor 34) includes a storage unit (RAM or ROM not shown) that stores a filter type and a filter coefficient for setting a plurality of filters having different cutoff frequencies or pass bands, and has an individual code assignment function that can associate an individual code (filter ID) with each of the plurality of filters, a corresponding filter is selected by selecting the individual code (filter ID) on the basis of the engine operating state, and the engine control device (ECU 100) includes a CPU 101 that processes the output signal from the sensor (knock sensor 34) using the selected filter.

According to the above embodiment, it is possible to provide an easy-to-use filter capable of reducing a work load of a parameter setting operator in response to increase in parameters constituting complicated filter control.

Each component, function, processing unit, processing means, and the like described above may be realized by hardware, for example, by designing a part or all of them in an integrated circuit, or the like.

Each component, function, and the like described above may be realized by software by interpreting and executing a program that the processor realizes each function. Information such as programs, tables, files, and the like that realize each function can be stored in a storage device such as a memory, a hard disk, or a solid state drive (SSD), or a storage medium such as an IC card, an SD card, or a DVD.

Also, control lines and information lines indicate what is considered to be necessary for explanation, and all control lines and information lines are not necessarily shown in the product. In practice, it can be considered that almost all the structures are mutually connected.

REFERENCE SIGNS LIST 1 air flow sensor
1a intake air temperature sensor
2 throttle sensor
3 water temperature sensor
4 crank angle sensor
5 accelerator opening sensor
6 air conditioner switch
7 neutral switch
8 air-fuel ratio sensor
9 cam angle sensor
20 fuel pump
21 fuel tank
22 pressure regulator
23 injector
32 power transistor
33 spark plug
34 knock sensor
5 intake valve
36 exhaust valve
37 valve timing variable mechanism
40 throttle valve
41 throttle drive motor
60 air cleaner
61 duct
62 collector
63 intake pipe
64 exhaust pipe
65 engine
66 cylinder
67 cylinder block
68 radiator fan
100 control ECU (signal processing device, engine control device)
101 CPU
102 power supply IC

The invention claimed is:

1. A signal processing device configured to filter an output signal from a sensor mounted on a vehicle, comprising:
a central processing unit (CPU) configured to:

set with respect to a plurality of filters having different filter types or filter coefficients for setting a filter characteristic of a cutoff frequency or a pass band,
set an individual code for each of the plurality of filters,
select the individual code based on an engine operating state so that a corresponding filter is selected, and
process an output signal from the sensor using the filter that has been selected,
wherein the sensor is a knock sensor configured to detect a knock of an engine mounted on the vehicle;
a storage configured to store a relationship with a specific frequency (Pfi) of a pressure wave in a cylinder corresponding to a specific frequency (Kfi) of a knock sensor signal for each engine operating state, and
wherein the CPU is configured to calculate a knock intensity (K(Kfi)) of the specific frequency of the knock sensor signal based on the signal processed by the filter that has been selected.

2. The signal processing device according to claim 1, wherein the CPU is configured to use the relationship between the specific frequency (Kfi) of the knock sensor signal and the specific frequency (Pfi) of the pressure wave stored in the storage unit and a weighting coefficient to calculate a knock intensity (Pfi)) of a specific frequency of a pressure sensor signal for detecting the pressure wave in the cylinder from the knock sensor signal.

3. The signal processing device according to claim 2, wherein,
(i) a filter ID is set for the relationship between the specific frequency (Kfi) of the knock sensor signal and the specific frequency (Pfi) of the pressure wave, and the weighting coefficient, and
(ii) the CPU selects the filter ID based on the engine operating state, the relationship between the specific frequency (Kfi) of the knock sensor signal and the specific frequency (Pfi) of the pressure wave, or the weighting coefficient corresponding to the filter ID is set.

4. The signal processing device according to claim 2, wherein, the CPU is configured to, when the CPU calculates a ratio of background level weighted average (BGLi) to knock intensity (P(Pfi)) for each of the specific frequency (Pfi), SLi=P (Pfi)/BGLi, and there are m specific frequencies, the CPU calculates $$\Sigma_{i=1}^{m} SLi$$

to calculate a knock determination indication I, and determine that a knock has occurred when the knock determination indication I is larger than a knock determination threshold Ith.

5. The signal processing device according to claim 1, wherein the engine operating state is at least one of a cylinder number of the engine, a rotation speed of the engine, a load of the engine, or a cooling water temperature detected by a water temperature sensor.

6. An engine control device configured to control an engine including a sensor, comprising:
a storage configured to store a filter type and a filter coefficient for setting a plurality of filters having different cutoff frequencies or pass bands, and
a central processing unit (CPU) having an individual code assignment function that can associate an individual code with each of the plurality of filters,
the CPU configured to select the individual code based on an engine operating state so that a corresponding filter is selected, and process an output signal from the sensor using the filter that has been selected,
wherein the sensor is a knock sensor that detects a knock of an engine mounted on the vehicle,
wherein the storage is configured to store a relationship with a specific frequency (Pfi) of a pressure wave in a cylinder corresponding to a specific frequency (Kfi) of a knock sensor signal for each engine operating state.

* * * * *